W. QUINLAN.
Tie-Links for Chains.

No. 154,806.　　　　　　　　　　　Patented Sept. 8, 1874.

Witnesses　　　　　　　　　　Inventor
John L. Boone　　　　　　　　William Quinlan
C. M. Richardson　　　　　　　by Dewey &
　　　　　　　　　　　　　　　　Attys

UNITED STATES PATENT OFFICE.

WILLIAM QUINLAN, OF MAYFIELD, CALIFORNIA.

IMPROVEMENT IN TIE-LINKS FOR CHAINS.

Specification forming part of Letters Patent No. 154,806, dated September 8, 1874; application filed April 27, 1874.

*To all whom it may concern:*

Be it known that I, WILLIAM QUINLAN, of Mayfield, Santa Clara county, State of California, have invented a Tripartite Tie-Link for Chains; and I do hereby declare the following description and accompanying drawings are sufficient to enable any person skilled in the art or science to which it most nearly appertains to make and use my said invention without further invention or experiment.

My invention relates to what I call a tripartite tie-link for chains; and it consists of a link, which is so constructed that it can be used for connecting any two links of a chain in almost an instant, so as to unite two or more chains into one continuous chain, or repair a broken one.

In order to describe my tripartite tie-link so that others will be able to understand its construction and operation, reference is had to the accompanying drawings forming a part of this specification, in which—

Figure 1:
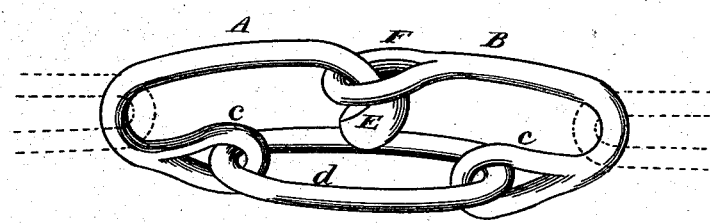
Figure 2:
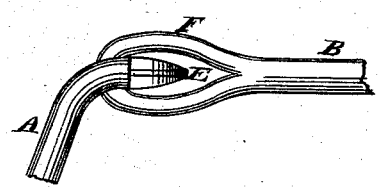

Figure 1 is a view of my tie-link for chains. Fig. 2 is a section, showing the connection.

A B are two short pieces of metal rod, of any size corresponding with the size of the rod used to form the links of a chain. These rods are bent into a U form, having one leg of the U longer than the other. The short leg of each U-shaped rod is formed into a ring, c, through which an ordinary chain-link passes, in order to connect the U-shaped rods A B. The extremity of the long arm of the U-shaped rod A is provided with a flattened arrow-shaped head, E, while the extremity of the opposite U-shaped rod is provided with an oval, elliptical, or other-shaped ring, F, through which the head E can be passed in the manner of an interlocking buckle, in order to connect the ends together. The end of the long arm of the U-shaped rod A, upon which the head E is formed, is bent inward toward the middle of the link d, and the ring end of the opposite long arm is also slightly bent inward, so that when the two ends are interlocked or connected together, a perfectly regular or even exterior is provided, with no projecting parts to catch or drag, the ends being turned to the inside of the link.

This tie-link can be made of any desired size, so as to correspond with the links of any-sized chain.

Every teamster, driver of a wagon, or other person having or using machinery in which chains are used, should carry or have one or more of these chain-connectors with him, so that in case a chain should break, or he should desire to connect two or more chains or pieces of chain together, he can do so.

To connect the links of a chain or two separate chains together, the head E is disengaged from the ring F, so as to open the link and allow the long arms of the U-shaped bars or rods to swing apart. The end links of the chains or pieces of chain are then hooked into the U-shaped end rods, and the ends of the rods are buckled or linked together, so that the tie-link will form one of the links of the chain, and unite the ordinary closed links, thus repairing or connecting the chains or pieces of chain.

It will be noticed that, by bending the ends of the long arms of the U-shaped rods inward toward the link d, a partition is formed, which prevents the links from changing ends or getting entangled, while it permits the link to pass through any opening or over a pulley, through or over which the ordinary chain-links will pass.

Any suitable buckling or interlocking device can be used for connecting the long arms of the rods together; but I prefer the arrow-head and opening, as one shoulder of the arrow-head may be made larger than the other, as represented, so that the two parts can only be disconnected or unbuckled by turning the smaller shoulder through the opening first, thus greatly lessening the liability of the parts being disconnected when in use.

If desired, the link d might be dispensed with, and the two shorter ends of the U-rods A B extended and linked or looped together, so as to form a hinge or loose connection; but I prefer to use the connecting-link, as it makes the tie-link more flexible.

This link can also be used for various other purposes, such as a tug attachment to single-tree clips, and for other similar fastenings.

Having thus described my invention, what

I claim, and desire to secure by Letters Patent, is—

1. The U-shaped rods A B, having the extremities of one arm of each linked or hooked together, while the extremities of the opposite arm are arranged to interlock, substantially as and for the purpose above described.

2. The U-shaped rods A B, and permanent connecting-link d, the long arms of said rods A B having interlocking devices, and bent inward toward link d, substantially as and for the purpose above described.

In witness whereof I hereunto set my hand and seal.

WILLIAM QUINLAN. [L. S.]

Witnesses:
GEO. H. STRONG,
JNO. L. BOONE.